United States Patent
Millmore et al.

(10) Patent No.: US 8,250,157 B2
(45) Date of Patent: Aug. 21, 2012

(54) PRESENCE MAPPING

(75) Inventors: Martin Millmore, Reading (GB); Dinesh Arora, Cupertino, CA (US); Michael Rossi, Manhattan Beach, CA (US); Aaron Green, San Francisco, CA (US); Paul Brimble, Yelverton (GB)

(73) Assignee: Oracle International Corporation, Redwood Shores, CA (US)

( * ) Notice: Subject to any disclaimer, the term of this patent is extended or adjusted under 35 U.S.C. 154(b) by 632 days.

(21) Appl. No.: 12/143,141

(22) Filed: Jun. 20, 2008

(65) Prior Publication Data

US 2009/0319595 A1    Dec. 24, 2009

(51) Int. Cl.
G06F 15/16 (2006.01)
G06F 17/00 (2006.01)
G09F 5/00 (2006.01)

(52) U.S. Cl. ........ 709/206; 345/581; 345/619; 345/629; 345/632; 345/633; 709/204; 715/200; 715/273

(58) Field of Classification Search .................. 345/581, 345/619, 629, 632–633; 709/204, 206; 715/200, 715/273
See application file for complete search history.

(56) References Cited

U.S. PATENT DOCUMENTS

| | | | |
|---|---|---|---|
| 6,718,341 B1* | 4/2004 | Berstis et al. .......................... | 1/1 |
| 6,965,876 B2 | 11/2005 | Dabbiere | |
| 7,323,991 B1* | 1/2008 | Eckert et al. ............... | 340/572.1 |
| 2007/0016649 A1* | 1/2007 | Nishiki .......................... | 709/206 |
| 2007/0124393 A1* | 5/2007 | Maes ............................. | 709/206 |
| 2008/0007568 A1* | 1/2008 | Chou et al. ..................... | 345/629 |
| 2009/0007145 A1* | 1/2009 | White et al. .................. | 719/318 |
| 2009/0129782 A1* | 5/2009 | Pederson ...................... | 398/135 |
| 2009/0157744 A1* | 6/2009 | McConnell ................ | 707/104.1 |

OTHER PUBLICATIONS

Lisa Guernsey, "You Can Surf, but You Can't Hide", http://tech2.nytimes.com/mem/technology/techreview.html, Feb. 27, 2008.

(Continued)

*Primary Examiner* — Ashok Patel
*Assistant Examiner* — Kevin Bechtel
(74) *Attorney, Agent, or Firm* — Squire Sanders (US) LLP

(57) ABSTRACT

Systems, methods, and associated software for detecting presence are described with respect to a number of embodiments of the present disclosure. More particularly, presence information can be displayed on a floor plan, according to the teachings herein. In one implementation, a method for monitoring the presence of a person is described in which the name of a person of interest is received from a requestor. The requestor and the person of interest are both associated with an organization. The method also includes retrieving information regarding a first work area associated with the person of interest and reproducing a section of a floor plan containing at least the first work area. Furthermore, the method includes sending the section of the floor plan to the requestor. The method also includes retrieving information regarding the person of interest associated with the first work area. A name field, which includes the name and the presence status of the person of interest, is sent to the requestor.

20 Claims, 6 Drawing Sheets

OTHER PUBLICATIONS

Christine Martz, "GPA-Global Presence Architecture", http://www.birds-eye.net/definition/g/gpa-global_presence_architecture.shtml, 2008.

Melanie Turek, "The Future of Presence", http://www.collaborationloop.com/index.php, May 13, 2004.

S.J. Vaughan-Nichols, "Presence technology: more than just instant messaging", http://ieeexplore.ieee.org/xpl/freeabs_all.jsp, Oct. 2003.

GAIA-Active Spaces for Ubiquitous Computing, "Presence Service", http://gaia.cs.uiuc.edu/html/presence.htm.

* cited by examiner

PRESENCE MAPPING

TECHNICAL FIELD

The embodiments of the present disclosure generally relate to determining the presence of a person of interest within an organization.

BACKGROUND

It can be desirable, and at times urgent, to determine whether or not a person of interest is present in a particular location. When a person wishes to communicate some information to another person at a remote location, there may be several ways to make contact. Some common methods include making a telephone call, sending an e-mail message, sending an instant message, etc. When making a telephone call, for example, the audible signals that are fed back to the caller can be indicative of the presence of the person being called. Presence indications may be as simple as a busy signal on the telephone, indicating that the person is present at the location and the phone is in use. When the phone continues to ring without someone answering, this can be an indication that no one is present at the location.

Sending an e-mail message usually does not provide the sender with an indication of the receiver's presence, unless the receiver responds immediately. However, some e-mail programs allow someone who is away for an extended time to generate an automatic return message indicating that he or she is not present. With most instant messaging (IM) programs, an indication is usually provided for informing the sender whether or not a person of interest is actively working on his or her computer or whether the computer is idle, on or off, etc.

When repeated attempts to track down a person of interest are unsuccessful using conventional communication equipment, it can be difficult to determine the presence of the person. The consequence of being unable to contact a person can be frustrating, and, at times, urgent information cannot be communicated to the person. The embodiments described in the present invention address and overcome the inadequacies of the conventional systems to provide improved systems and methods for determining presence of a person of interest.

SUMMARY

The embodiments discussed herein describe systems, methods, and software for detecting presence of a person of interest and reproducing a map or floor plan of a work area of the person. According to one embodiment described in the present disclosure, a method includes receiving from a requestor the name of a person of interest, wherein both the requestor and person of interest are associated with an organization. The method further includes retrieving information regarding a first work area associated with the person of interest and reproducing a section of a floor plan containing at least the first work area. Also, the method includes sending the section of the floor plan to the requester. In addition, the method retrieves information regarding the person of interest associated with the first work area in the section of the floor plan. Name fields are then sent to the requester, wherein the name fields include the name and presence status of the person of interest.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

The embodiments of the present disclosure describe systems, methods, and software configured to determine the presence of a person of interest within an organization. In addition to merely determining presence, the embodiments also include using floor plans of an organization to show the surrounding areas around which the person normally works. By using software similar to instant messaging (IM), the presence status of the person with respect to a data network of the organization can be determined. Furthermore, other mechanisms may be used to determine the person's presence. The embodiments disclosed herein may use telephone activity, cellular phone activity, or even physical presence monitoring, such as motion detectors or cameras.

Not only is the presence of the person of interest determined, but also the presence of the people in the vicinity of the person can also be determined. Based on the floor plan information and the associated work areas of the people in the organization, the organization's floor plan can be used to reproduce a section of the floor plan showing a diagram of the work area of the person of interest and the work area of the people in the vicinity. Also, the presence status of the other people can also be shown on the floor plan section. In this way, if it is determined that a person of interest is not present at a given location, then someone working in vicinity of that person can be contacted. If it is known that a person in the vicinity of the person of interest is present, then that person can be contacted if necessary to attempt to gather more information of the whereabouts of the person of interest. The display of the floor plan can be set to include any suitable size or dimension in order to show any number of people in the vicinity of the person of interest. Other implementations, benefits, and advantages will become apparent to one of ordinary skill in the art from an understanding of the embodiments of the present disclosure.

Figure 1:
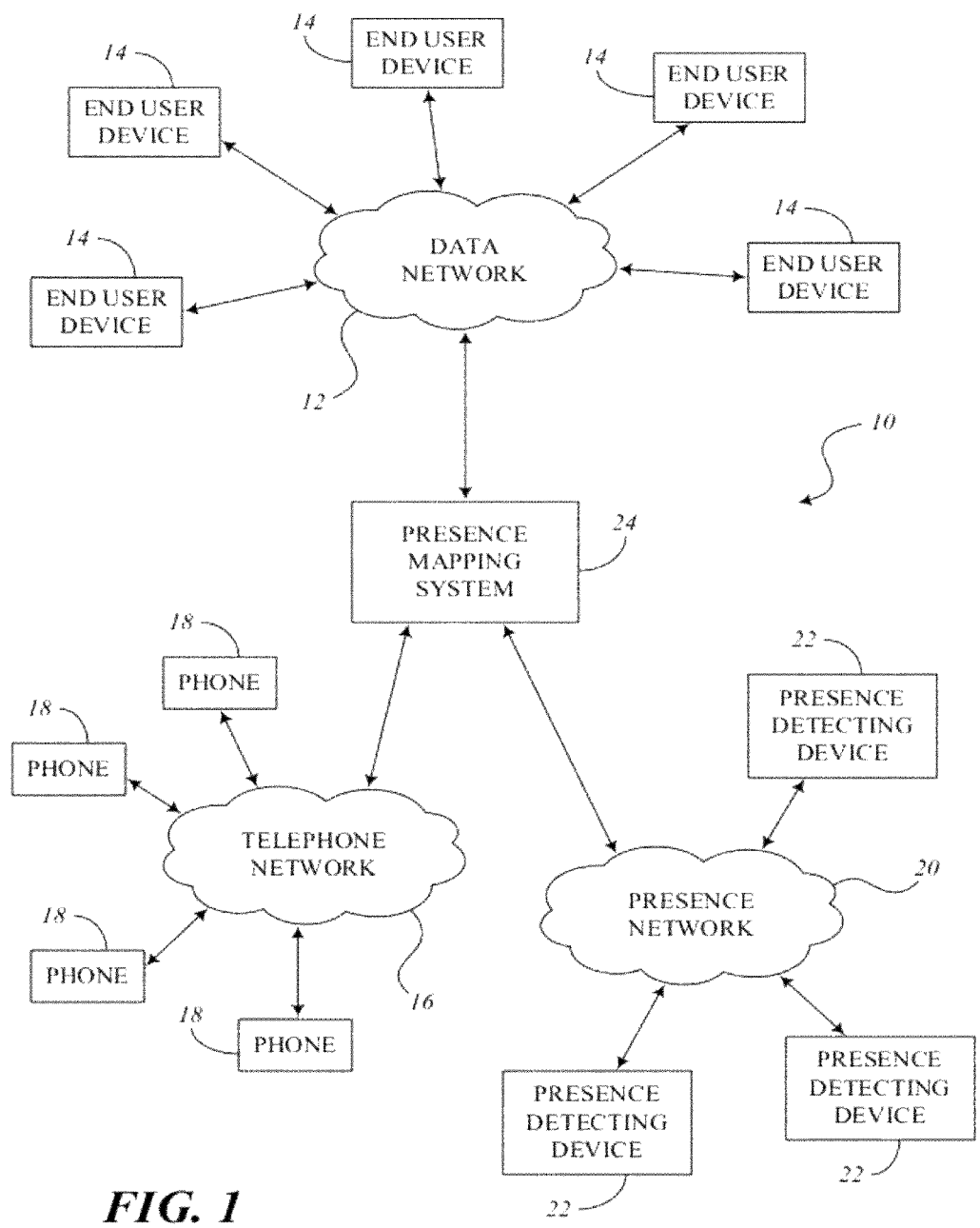
FIG. 1 is a block diagram illustrating an organization system according to one embodiment.

FIG. 1 is a block diagram of an embodiment of an organization system 10. Organization system 10 may represent any type of system of one or more networks that may be in use within an organization, business, enterprise, government agency, department, group, family, etc. In the embodiment shown in FIG. 1, organization system 10 includes a data network 12 connected to a number of end user devices 14, a telephone network 16 connected to a number of phones 18, and presence network 20 connected to presence detecting devices 22. In other embodiments, organization system 10 may include other types of networks or these or other networks can be integrated together in any suitable combination. Organization system 10 further includes a presence mapping system 24, which is connected to data network 12, telephone network 16, presence network 20, and/or any other network associated with organization system 10. In some embodiments, presence mapping system 24 may be a part of or associated with an enterprise resource planning (ERP) system. The connections between different components of organization system 10 may include any suitable combination of wired and/or wireless communication elements or channels.

Data network 12 may include any suitable combination of routers, switching devices, memory, etc., to allow end user devices 14 to access information via data network 12. Also, end user devices 14 can share information with other end user devices 14, transmit messages to other end user devices 14, etc. End user devices 14 may be embodied as any suitable processing device capable of transmitting and receiving data. Some non-limiting examples of end user devices 14 include computers, such as desktop computers or laptop computers, cell phones with data exchange capabilities, etc. Information can be gathered from data network 12 to determine the presence of a person based on activity of a device respectively associated with that person. For example, the Internet Protocol (IP) address of the device can be detected to monitor activity of the device.

Telephone network 16 may include a land-line telephone system, a cellular telephone system, an Internet phone system, and/or any other suitable voice receiving and transmitting system or network. Telephone network 16 may include features commonly used within organizations, such as the ability to forward calls, using a central telephone number for the organization where individuals can be contacted using extension numbers, etc. Phones 18 may include land-line phones, mobile phones, smart phones, or other suitable telephones. Information can also be gathered from telephone network 16 to determine the presence of a person based on telephone activity. In some embodiments, telephone activity may be monitored using an IP address of IP-enabled telephones, dialing information, global positioning system (GPS) information, cell tower information, etc.

Presence network 20 may include any suitable means for providing information to presence mapping system 24 concerning the detection of the presence of one or more people within the organization. In some embodiments, presence network 20 may be part of or incorporated in data network 12 or another network. Presence network 20 receives information of presence from presence detecting devices 22. Presence detecting devices 22 may include any suitable combination of motion detectors, cameras, GPS devices, radio frequency (RF) devices, heat detecting devices, pressure or force detecting devices, or any other type of device for monitoring the presence of a person in a certain location. In this regard, presence detecting devices 22 may include devices for monitoring "physical" presence, such as by visual monitoring, or "virtual" presence, such as using by GPS monitoring or other type of monitoring related to location or position information of a portable device associated with the person of interest.

As suggested above, presence mapping system 24 may be associated with an ERP system to combine different types, formats, protocols, etc., of the information related to the different networks of organization system 10. Presence mapping system 24 can include several different components that are located in more than one location throughout organization system 10. In this way, presence mapping system 24 can combine human resources information, mapping or floor plan information, presence information, or other combinations of information for enabling an integration presence technology and personnel information with floor plan information.

Presence mapping system 24 is configured to store personnel information, such as information that may be on record in a human resources database. The personnel information may include, for example, names of employees or members of the organization, office phone numbers, extension numbers, cell phone numbers, Internet protocol (IP) address information associated with devices used by or assigned to the employees or members, names of managers of the employees or members, emergency contact information, etc.

Presence mapping system 24 is also configured to store mapping information, such as country, state, and city information, street map information, building information, and floor plan or lay out information concerning floors of buildings used by the organization. The mapping and floor plan information can be used particularly when the real estate of an organization is spread out among multiple locations on different floors of a building, different buildings, different cities, and/or different countries.

On the floor plan level, the information may include blueprint-type locations of walls, stairwells, elevators, reception areas, rooms, offices, cubicle locations, etc. Also, the floor plan information may also include the location of furniture, such as desks, chairs, etc. The floor plan information also includes particular spaces of the organization, referred to herein as "work areas," where people can access data network 12, telephone network 16, or other networks.

In the discussion of embodiments of the present invention, work areas may be defined by locations where an employee or member may access or be within range of data network 12, telephone network 16, presence network 20, and/or other networks. For example, a work area may exist within an office where a computer may be connected to data network 12 or where a telephone may be connected to telephone network 16. The work area may include an office, a cubicle location, a meeting room, or other locations where network access is possible. Other areas of the real estate of an organization can be monitored for presence detection by mechanisms other than those that can be monitored by data network activity or telephone network activity, e.g., motion sensors, cameras, etc.

Combining the personnel information and floor plan information, a record can be stored that associates each person to one or more work areas. For the people who normally work in a single location, presence mapping system 24 can associate these people to one respective work area. For people who tend to "hot-desk" or connect to the networks from any number of locations, presence mapping system 24 may rely on presence information to determine the current location of these people. In other embodiments, presence mapping system 24 may store a number of likely locations where each roaming person may be located. Therefore, the floor plan information can include coded information for identifying each work area and can also include information that associates people to one or more the respective work areas.

When a user at a first end user device 14 wishes to contact a person of interest or to determine that person's presence, a request can be made to presence mapping system 24 to provide a map or floor plan of the location of the person. In response, presence mapping system 24 determines the work area associated with the person. If the person is categorized as having a fixed work area, presence mapping system 24 looks up the personnel information to determine the particular work area associated with that person. If the person is categorized as having a hot-desk, presence mapping system 24 determines the work area of the person based on presence information.

Presence mapping system 24 retrieves a floor plan of the particular building and floor containing the location of the work area associated with the person of interest. From this floor plan, a section or a portion of the floor plan can be reproduced for illustrating an area surrounding the work area in question. The surrounding area may include other work areas associated with other people. By determining these other work areas, the people associated with the other work areas can be determined as well. Also, the presence status of not only the person of interest, but also the people in the vicinity, can be determined and displayed on the map.

Furthermore, presence mapping system 24 can receive signals from each of the various networks to determine the presence of people associated with the work areas within the specific section of the floor plan. More particularly, presence mapping system 24 may determine the presence of the people based on the particular end user devices 14, which are related to the respective work areas, being either on-line or off-line, active or idle, etc. Likewise, based on call activity of phones 18 related to the respective work areas, presence mapping system 24 can also monitor the presence of people associated with the respective phones 18. Presence mapping system 24 may also detect presence based on information received from presence detecting devices 22 according to the particular application of presence detecting devices 22. Thus, the detection of presence of one or more people in an organization can be based on any specific activity that can be monitored within the respective networks.

According to an example of an application of organization system 10, a requestor may wish to locate a particular person and may send the person's name to presence mapping system 24. Presence mapping system 24 reproduces the section of the floor plan and sends the information to the requesting end user device 14 along with the names of the people associated with work areas within the section. On the requestor's end user device 14, the floor plan map can be displayed showing the names of the people at the designated work areas. From the presence information, the map can also display the activity or presence status of the people within the particular section of the displayed map. Using a suitable user interface associated with end user device 14, the requester may further request to see additional personnel information of a particular person within the section of the map. The additional information, for example, may include phone numbers, extension numbers, cell phone numbers, a manager's name, emergency contact numbers, etc. If contact attempts with the person of interest are unsuccessful, the user may determine the on-line status of others in the vicinity. With this knowledge, the user may contact these other people to determine if they might know the whereabouts of the person of interest. Other particular examples of organization system 10 will become apparent from an understanding of the embodiments described in the present disclosure.

Figure 2:
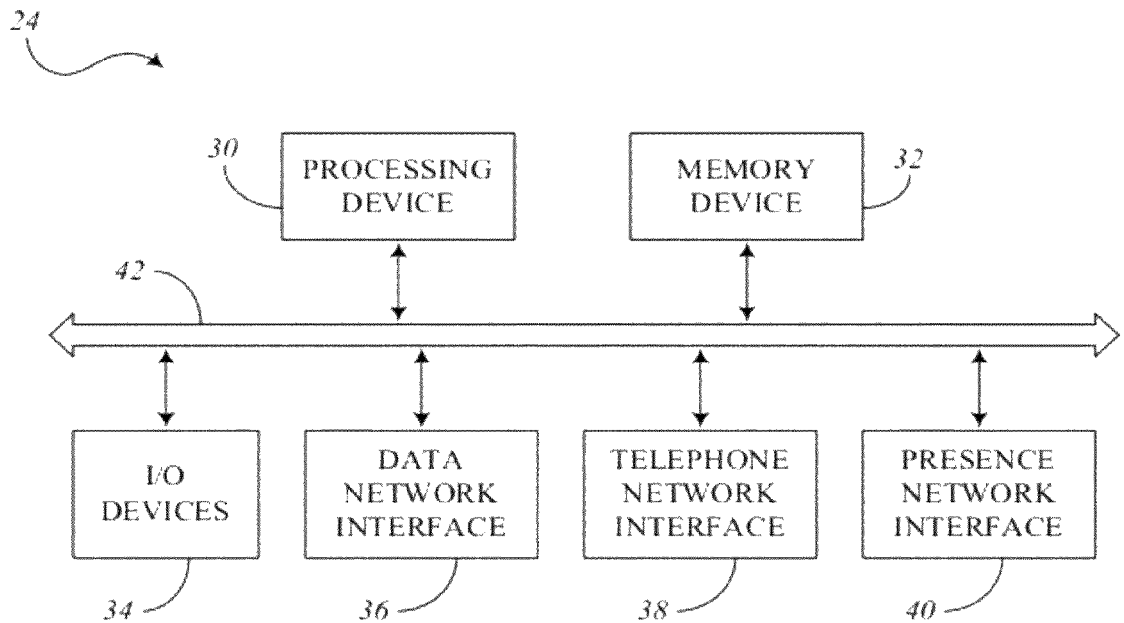
FIG. 2 is a block diagram illustrating the presence mapping system shown in FIG. 1 according to one embodiment.

FIG. 2 is a block diagram of an embodiment of the presence mapping system 24 shown in FIG. 1. In this embodiment, presence mapping system 24 includes a processing device 30, memory device 32, input/output (I/O) devices 34, data network interface 36, telephone network interface 38, and presence network interface 40. These components of presence mapping system 24 are interconnected via a bus 42. Presence mapping system 24 can be configured from multiple devices in multiple locations and, in some implementations, may be part of an ERP system. As an example, floor plan records may be stored in memory in one facility while human resources information may be stored in memory in another facility. In some embodiments, any one or more of the network interfaces may be used as needed. For the applications in which certain networks do not exist or are combined with other networks, the respective network interfaces may be omitted as necessary.

Processing device 30 may be a general-purpose or specific-purpose processor or microcontroller. Memory device 32 may include one or more internally fixed storage units, removable storage units, and/or remotely accessible storage units. The storage units can be configured to store information, data, instructions, and/or software code. The storage units may include any combination of volatile memory, such as random access memory (RAM), dynamic RAM (DRAM), etc., and/or non-volatile memory, such as read only memory (ROM), electrically erasable programmable ROM (EEPROM), flash memory, etc.

Memory device 32 can also store program code that enables processing device 30 to execute presence mapping procedures. Various logical instructions or commands may be included in the program code for mapping presence of people. The embodiments of presence mapping programs described in the present disclosure can be implemented in hardware, software, firmware, or a combination thereof. When implemented in software or firmware, the presence mapping program can be stored in memory device 32 and executed by processing device 30. When implemented in hardware, the presence mapping program can be implemented in processing device 30 using discrete logic circuitry, an application specific integrated circuit (ASIC), a programmable gate array (PGA), a field programmable gate array (FPGA), other suitable logic circuit, or any combination thereof.

Presence mapping programs or software, which can be stored partially or fully in memory device 32, and any other software, programs, or computer code including executable logical instructions as described herein, can be embodied in computer-readable media for execution by any suitable processing device, such as processing device 30. The computer-readable media as described herein can include one or more suitable physical media components that can store the software, programs, or computer code for a measurable length of time.

In particular, memory device 32 may store IM programs or other suitable programs for enabling the detection of presence of people within the organization based on network activity. Memory device 32 also stores maps, which may include countries, cities, streets, and/or buildings. Memory device 32 also stores floor plans, blueprints, etc., which may further contain information regarding the usage of space, walls, offices, rooms, cubicles, etc., and even furniture, such as desks. In addition, memory device 32 stores locations on the floor plans that are defined as work areas, as mentioned above, where various networks can be accessed. Also, the associations between each employee or member of the organization and one or more work areas can be stored in memory device 32. Additionally, memory device 32 stores personnel information, e.g. names, phone numbers, extension numbers, etc.

I/O devices 34 may include input mechanisms such as keyboards, keypads, cursor control devices, or other data entry devices. The input mechanisms may be used for entering information in memory device 32. For example, during a set-up mode, input mechanisms may allow a user to enter floor plans of each of the buildings associated with the organization. Other entries, such as data entry of employee information, association information of work areas with respect to different people, etc., can be made to the input mechanisms. I/O devices 34 also include output devices, which may be computer monitors, audio output devices, printers, or other peripheral devices.

Figure 3:
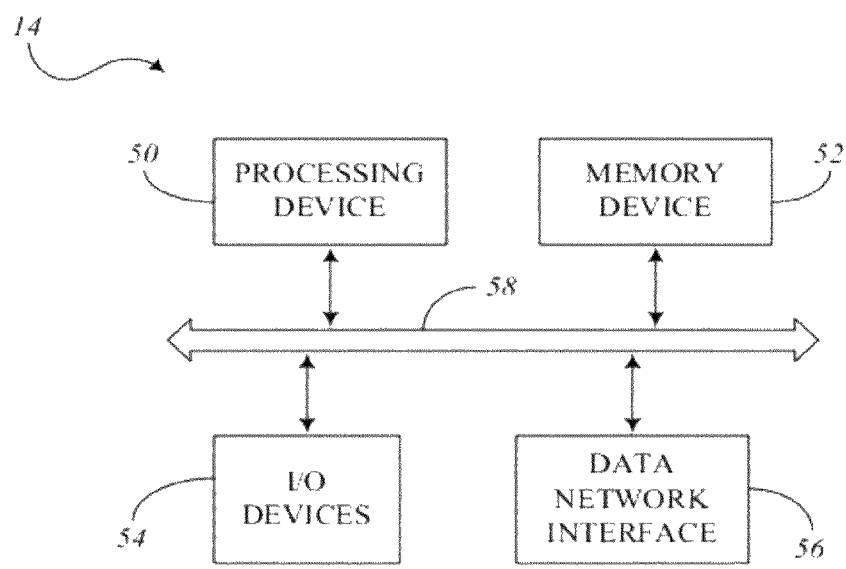
FIG. 3 is a block diagram illustrating one of the end user devices shown in FIG. 1 according to one embodiment.

FIG. 3 is a block diagram of an embodiment of one of the end user devices 14 shown in FIG. 1. In this embodiment, end user device 14 includes a processing device 50, a memory device 52, I/O devices, and a data network interface 56, each interconnected via bus 58. End user device 14, for example, may be configured as a computer, data processor, or other suitable electronic device for running a software application.

Processing device 50 may be a general-purpose or specific-purpose processor or microcontroller. Memory device 52 may include one or more internally fixed storage units, removable storage units, and/or remotely accessible storage units. The storage units can be configured to store information, data, instructions, and/or software code. The storage units may include any combination of volatile memory, such as RAM, DRAM, etc., and/or non-volatile memory, such as ROM, EEPROM, flash memory, etc.

Memory device 52 can also store program code that enables processing device 50 to execute presence mapping procedures. In some embodiments, presence mapping procedures are stored in memory device 32 of presence mapping system 24 shown in FIG. 2 and also stored in memory device 52 of end user device 14 shown in FIG. 3. In other embodiments, the presence mapping procedures can be stored partially or fully in either or both of memory devices 32 and/or 52. Memory device 52 may store an IM program or other similar program capable of detecting presence or activity information.

Various logical instructions or commands may be included in the program code for mapping presence of people in an organization. The embodiments of the presence mapping programs discussed herein can be implemented in hardware, software, firmware, or a combination thereof. When implemented in software or firmware, the presence mapping program can be stored in memory device 52 and executed by processing device 50. When implemented in hardware, the presence mapping program can be implemented in processing device 50 using discrete logic circuitry, an ASIC, a PGA, a FPGA, etc., or any combination thereof.

Presence mapping software, which can be stored fully or partially in memory device 52, and any other software, programs, or computer code including executable logical instructions as described herein, can be embodied in computer-readable media for execution by any suitable processing device, such as processing device 50. The computer-readable media can include on one or more suitable physical media components that can store the software, programs, or computer code for a measurable length of time.

I/O devices 54 may include input mechanisms such as keyboards, keypads, cursor control devices, and/or other data entry devices. Output devices may include a computer monitor, audio output device, printer, or other peripheral devices. Also, I/O devices 54 may include components for communicating with user interface mechanisms using wired and/or wireless channels.

Data network interface 56 may also be configured using wired or wireless components. Data network interface 56 includes components for accessing data network 12 and includes a designated network access location related to the respective work area. The designated network access location can be included in the floor plan information to associate the location of the port or terminal where end user device 14 is connected to data network 12. Depending on the particular application, the actual work area location and network access location can be near each other.

Figure 4:
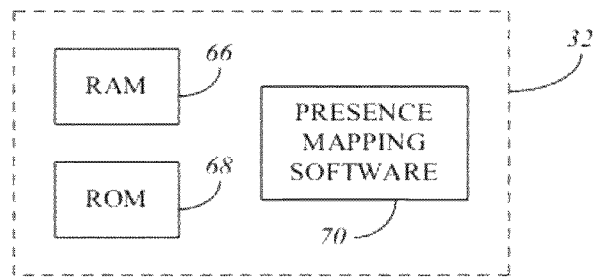
FIG. 4 is a block diagram illustrating memory of the presence mapping system shown in FIG. 2 according to one embodiment.

FIG. 4 is a block diagram of an embodiment of memory device 32 shown in FIG. 2. According to this embodiment, memory device 32 includes RAM 66, ROM 68, and presence mapping software 70. As suggested above, the components of memory device 32 can be embodied in different memory components located in different devices or locations. Also, some or all of these components may be stored in memory device 52 shown in FIG. 3. In some embodiments, ROM 68 stores floor plan information and human resources information. Based on presence information, human resources information can be updated to reflect a move to a different office, different building, etc. Updates can also be made when it is determined that a person changes categories from having a fixed work area to having a hot-desk, or vice versa.

ROM 68 also stores information for forming associations between the people in the organization and respective work areas for the fixed workers or even a number of likely locations where a roaming worker may be. With regard to roaming workers, presence mapping software 70 may include an algorithm to determine an ordered list of possible locations where the person can be found. Such an algorithm may be based on where the roaming worker was last detected, recent location history, or other factors.

Figure 5:
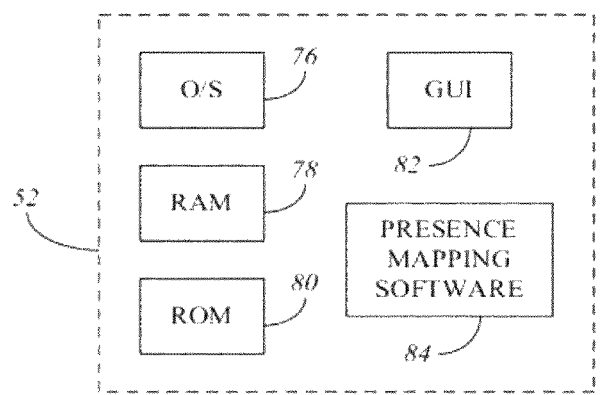
FIG. 5 is a block diagram illustrating memory of the end user device shown in FIG. 3 according to one embodiment.

FIG. 5 is a block diagram of an embodiment of the memory device 52 shown in FIG. 3. Memory device 52, according to this embodiment, includes operating system (O/S) 76, RAM 78, ROM 80, graphical user interface (GUI) 82, and presence mapping software 84. In some embodiments, all or parts of presence mapping software 84 may be stored in memory 32 shown in FIG. 2. RAM 78 may include cache memory for temporarily storing information received from presence mapping system 24. For example, presence mapping system 24 may provide a section of a floor plan associated with a location of the person to be found. Also, RAM 78 may store name fields that include the names of the people associated with work areas in the section of the floor plan. The name fields may also include presence status information, such as on-line, off-line, active, idle, etc. In addition, expanded fields received from presence mapping system 24 can be stored in RAM 78. The expanded fields, in some embodiments, can include further information about the people shown on the floor plan map, such as phone numbers, extension numbers, cell phone numbers, e-mail addresses, emergency contact information, etc.

Figure 6:
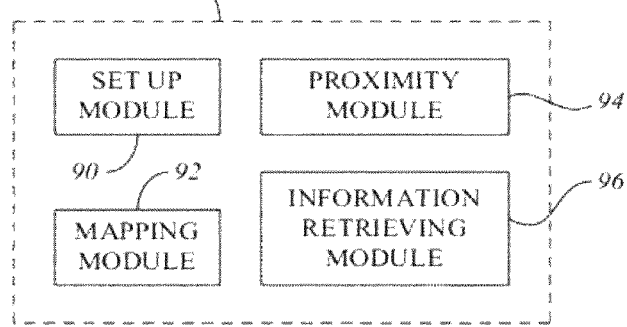
FIG. 6 is a block diagram illustrating the presence mapping software shown in FIG. 4 according to one embodiment.

FIG. 6 is a block diagram of an embodiment of presence mapping software 70 shown in FIG. 4, which may embody presence mapping software 70 stored in memory 32 of presence mapping system 24. In this embodiment, presence mapping software 70 includes a set up module 90, a mapping module 92, a proximity module 94, and an information retrieving module 96. Set up module 90 enables a person, such as an administrative or human resources staff member, to enter human resources data regarding names, phone numbers, etc. Set up module 90 can also be used to enter and store floor plans of the buildings used by the organization. Set up module 90 may utilize any suitable combination of devices for obtaining floor plans or other graphical representations of the buildings, such as, for example, a computer-aided design (CAD) program, scanner, photographic equipment, etc. The floor plan data can be set up to include work areas thereon where devices can be used to access the network or organization system 10. Also, associations between people and work areas are entered using set up module 90 to establish a fixed location for the non-roaming individuals.

Normally, the set up is done up-front before presence can be mapped. With the information uploaded, the data can be retrieved as necessary to perform the presence mapping procedures described herein. Therefore, set up may be required only once. However, as changes are made in an organization, set up module 90 can be used to update information to change work area locations of people, delete records of people who leave the organization, or to change other information regarding floor plans, work areas, personnel information, associations between people and work areas, etc. Records can also be stored to designate whether each person is categorized as having a fixed work area or as having a hot-desk. Set up module 90 may also be used to record the IP addresses of devices that are respectively assigned to people of the organization for detecting presence during normal operation of the devices.

Mapping module 92 is used in presence mapping software 70 for determining a section of the available floor plans that includes a person of interest. Mapping module 92 may reproduce the section of the floor plan based on the work area location of the person of interest. If the person is categorized as having a fixed work area, the section of the floor plan is centered around the fixed work area. For a person categorized as having a hot-desk, the work area may be based on presence data obtained at the particular moment or may be based on likely work area locations where the roaming individual may be. In some embodiments, a person may simply enter his or her current location within the organization into mapping module 92. Depending on the particular application, mapping module 92 reproduces a section of the floor plan including at least some area around the work area associated with the person of interest. In some embodiments, floor plan information can be reproduced directly from a CAD file.

Proximity module 94 takes the section of the floor plan that was reproduced by mapping module 92 and determines the work areas in that section of the floor plan. Also, proximity module 94 determines the people who are associated with those work areas in the specific section. In some embodiments, proximity module 94 can also determine the presence status of the people in the section. By using presence detecting software, such as IM, proximity module 94 can determine whether each person in the specific section of the floor plan is present. In order to monitor presence, proximity module 94 may receive information about each person's activity with respect to data network 12, telephone network 16, presence network 20, etc. From the information received by proximity module 94, name fields can be generated, where each name field include the name of the person associated with a respective work area and the presence status of the person. The name fields can be superimposed or overlaid on the respective work areas of the section of the floor plan reproduced by mapping module 92. Name fields may also include the presence status of the people. Therefore, when the section of the floor plan is displayed, the names of the people in the vicinity of the person of interest is displayed as well as the presence status of the people. From this display, the requester can easily determine who may be available in the vicinity of the person of interest.

Information retrieving module 96 accesses the records in ROM 68 to retrieve certain information about each of the people associated with work areas in the section of the floor plan, as determined by proximity module 94. Information retrieving module 96 may retrieve information regarding names of the people, e-mail addresses, telephone numbers, extension numbers, cell phone numbers, facsimile numbers, names of managers, emergency contact numbers, etc. The information gathered by information retrieving module 96 can be used to create an expanded field. The expanded fields can include any desirable pieces of information about each person. In response to a request to see the additional information, the expanded fields can be transmitted to the original requesting user to be used as needed. In this regard, with the names of the people in the original displayed view, the user may notice that one or more people in the vicinity of the person of interest are indicated as being on-line or present. To contact one or more of these people, the user can then retrieve further information about these people upon request.

Figure 7:
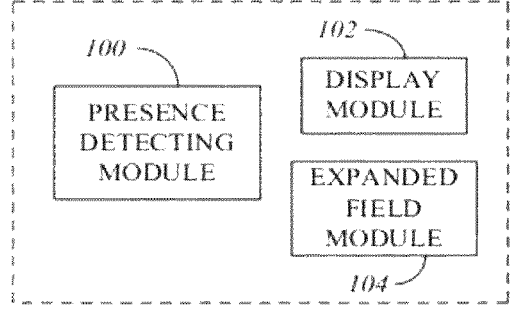
FIG. 7 is a block diagram illustrating the presence mapping software shown in FIG. 5 according to one embodiment.

FIG. 7 is a block diagram of an embodiment of the presence mapping software 84 shown in FIG. 5. As suggested above, some or all of the components of presence mapping software 84 may be integrated within presence mapping software 70 of memory 32 of presence mapping system 24. In this embodiment, presence mapping software 84 includes a presence detecting module 100, a display module 102, and a expanded field module 104. If presence is already determined by presence mapping software 70 of presence mapping system 24, then presence detecting module 100 may be omitted. In some embodiments, presence detecting module 100 receives the names or work areas of the people in the specific section of the floor plan determined by proximity module 94. In response to receiving the names or work areas, presence detecting module 100 determines activity of the people on data network 12, telephone network 16, and/or other networks to determine the presence status of these people. As mentioned above, presence can be determined using software similar to IM. Furthermore, presence detecting module 100 can determine presence based on fixed work areas or on current or recent network activity.

Display module 102 is configured to display the map or floor plan section showing the area around the person of interest. In some embodiments, the map section may show the respective city in which the person of interest is located, such that the user may control the view to zoom in or out as desired. In some embodiments, the map may include street information or building information. Furthermore, when the view shows information in a manner zoomed in closer than the exterior dimensions of a building, the floor plan information can be used to show the actual spaces within the building or of a particular floor of the building that are within the real estate spaces of the organization. The section of the floor plan that display module 102 displays also includes the name fields overlaid on the work areas to show the association between the people and the respective work areas. The name field may include not only the names of the people at the various work areas, but also the presence status. The presence status may show various degrees of certainty of the presence of a person based on the latest time that presence of the person was actually detected or other factors.

When the view is zoomed down to the floor plan level, expanded field module 104 may be used. Expanded field module 104 is configured to store the expanded fields related to the additional information of the people in the specific section of the floor plan. Expanded field module 104 detects when the user requests additional information by any suitable user interface. In one example, a user can maneuver a cursor control device and hovers a cursor over one of the name fields for a predetermined amount of time. When it is detected that a user requests additional information, expanded field module 104 displays the respective expanded field in any suitable manner, such as, for example, superimposed over the corresponding name field or in a split display manner, etc. In this way, expanded field module 104 enables the user to get additional information about the person of interest or about a people in the vicinity of the person of interest. If it is determined that the person of interest is not available, the other people in the vicinity of the person can also be contacted to get a better idea of the whereabouts of the person of interest. Since the presence status of the other people is also displayed, another available person might be contacted first.

Figure 8:
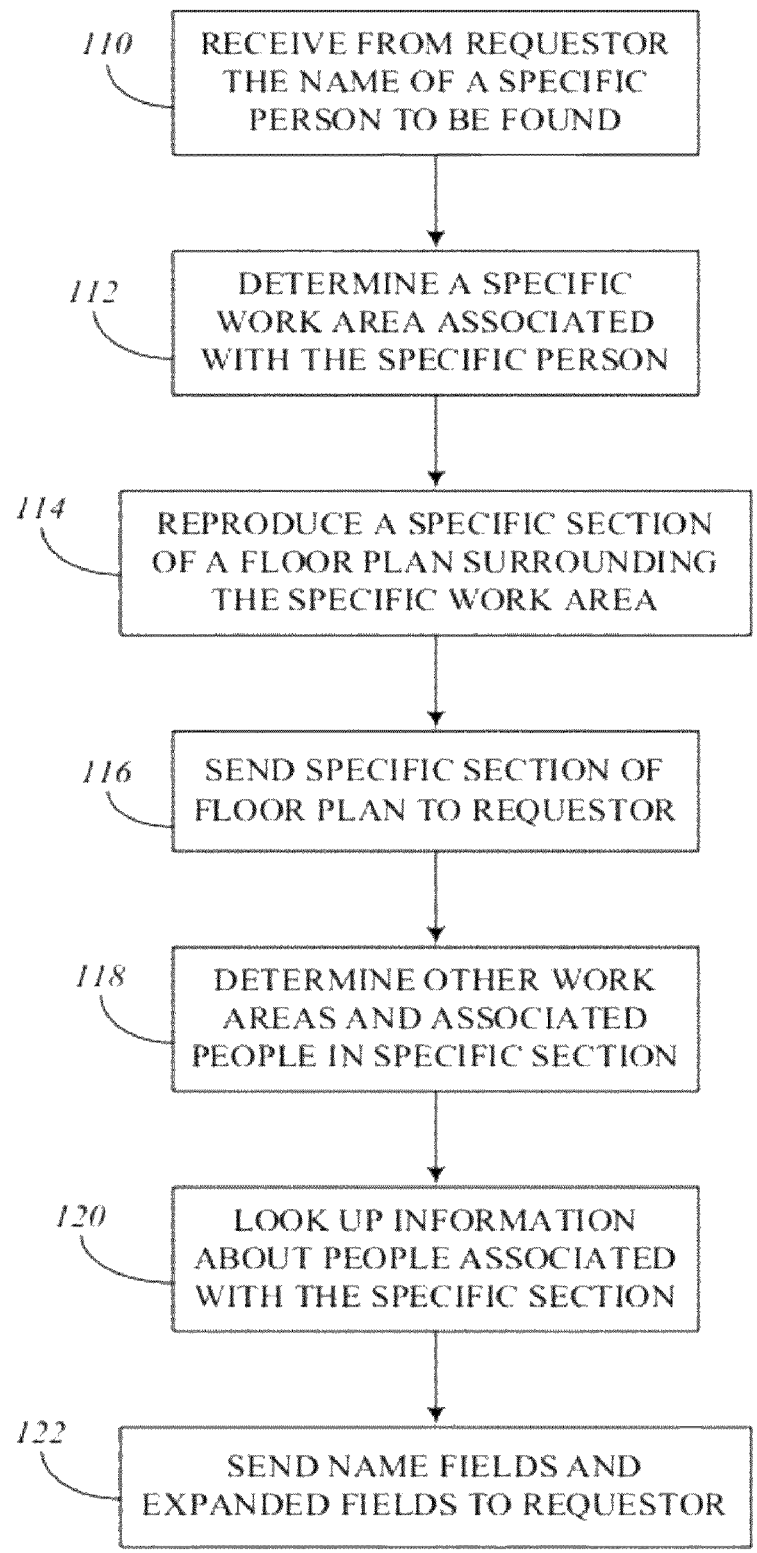
FIG. 8 is a flow chart illustrating a method for providing presence information according to a first embodiment.

FIG. 8 is a flow chart illustrating an embodiment of a method of procedures performed by a host device, such as the presence mapping system 24 shown in FIG. 1. The method of FIG. 8 includes receiving from a requesting user the name of a specific person to be found, as indicated in block 110. The person of interest is someone who is associated with a particular organization. The requestor can also be associated with the organization or, in some cases, may be a visitor. As indicated in block 112, a specific work area associated with the specific person is determined. Using a look-up table within a database associated with the organization, the work area of the specific person can be looked up if the person is categorized as having a fixed work area. If a person is categorized as having a hot desk, the work area can be determined by searching one or more networks associated with the organization to monitor the activity of the person at a particular work area. According to block 114, a specific section of a floor plan surrounding the specific work area is reproduced. For instance, the specific section of the floor plan can include areas that are centered around the specific work area associated with the specific person to be found. The specific section of the floor plan is then sent to the end user device associated with the requester, as indicated in block 116.

According to block 118, other work areas within the specific floor plan section are determined. The people associated with these work areas are also determined. According to block 120, information about these people associated with the specific section of the floor plan is looked up in a database. This information may include names, phone numbers, extension numbers, cell phone numbers, e-mail addresses, emergency contact information, name of the person's manager, picture of the person, etc. Name fields and expanded fields are sent to the end user device associated with the requester, as indicated in block 122. The name fields may include information regarding the names of each of the people in the specific section of the floor plan and may also include the presence status of the people. The presence status may be described using terms such as "active", "idle", "on-line", "off-line", or other suitable descriptive terms, symbols, or characters. The expanded fields include additional information about the people in the specific section, such as phone numbers, e-mail addresses, emergency contact information, pictures, etc.

Figure 9:
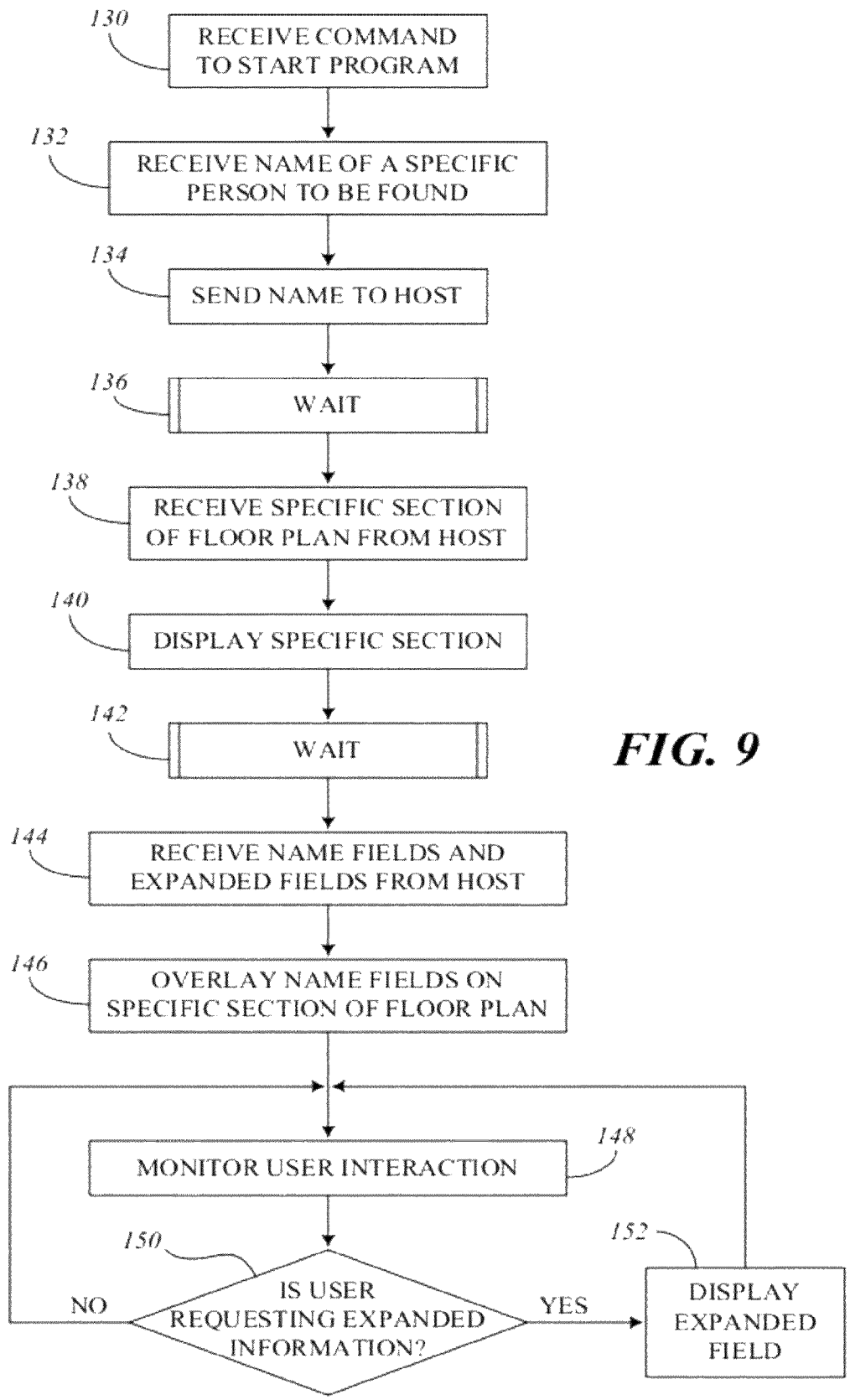
FIG. 9 is a flow chart illustrating a method for mapping presence information according to a second embodiment.

FIG. 9 is a flow chart illustrating an embodiment of a method of procedures performed by an end user device, such as one of end user devices 14 shown in FIG. 1. The end user device is associated with the device used by the searcher or person attempting to locate someone else in the organization. The method of FIG. 9, according to this embodiment, includes receiving a command from the user to start the presence mapping program, as indicated in block 130. When the program is started, the method includes receiving a name of a specific person to be found, as indicated in block 132. According to block 134, the name to be searched is then sent to a host device, such as presence mapping system 24, which is capable of determining the presence of people with respect to specific work areas or other locations of an organization and is also capable of determining the presence of people in the physical vicinity of the specific person.

After sending the name to the host to request presence mapping information, the method waits, as indicated in block 136, for a response from the host regarding mapping information. In block 138, it is indicated that a specific section of a floor plan is received from the host. The method then includes displaying the specific section, as indicated in block 140. Particularly, the specific section may include a portion of a map, blueprint, or floor plan. Also, the specific section may be retrieved from a database in which the information was entered via a CAD system, a scanning system, or other entry method. The specific section is reproduced from areas around the specific work area associated with the person of interest. The floor plan section may be any suitable size to show not only the work area of the specific person, but also at least one other work area in the physical vicinity of the work area associated with the specific person.

As indicated in block 142, the method waits again, this time for the names and other information of the people associated with the work areas within the boundary of the specific section. As indicated in block 144, name fields and expanded fields are received. The name fields include the names of each of the people in the specific section. The name fields may also include the presence status of these people. The expanded field includes additional information about each person in the specific section that can be displayed upon request. According to block 146, the name fields are overlaid on the specific section. More specifically, the name fields are superimposed on the floor plan section where the respective work areas are located.

The method further comprises monitoring for a user interaction via any suitable user interface device, as indicated in block 148. Such user interaction can be determined to be a request for additional information of a particular person. According to decision block 150, it is determined whether the user is requesting to see the expanded information. If so, then the expanded field is displayed, as indicated in block 152. The method then returns to block 148 to continue monitoring for user interaction. If it is determined in block 150 that the user is not requesting expanded information, then the monitoring of user interaction continues.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

Figure 10:
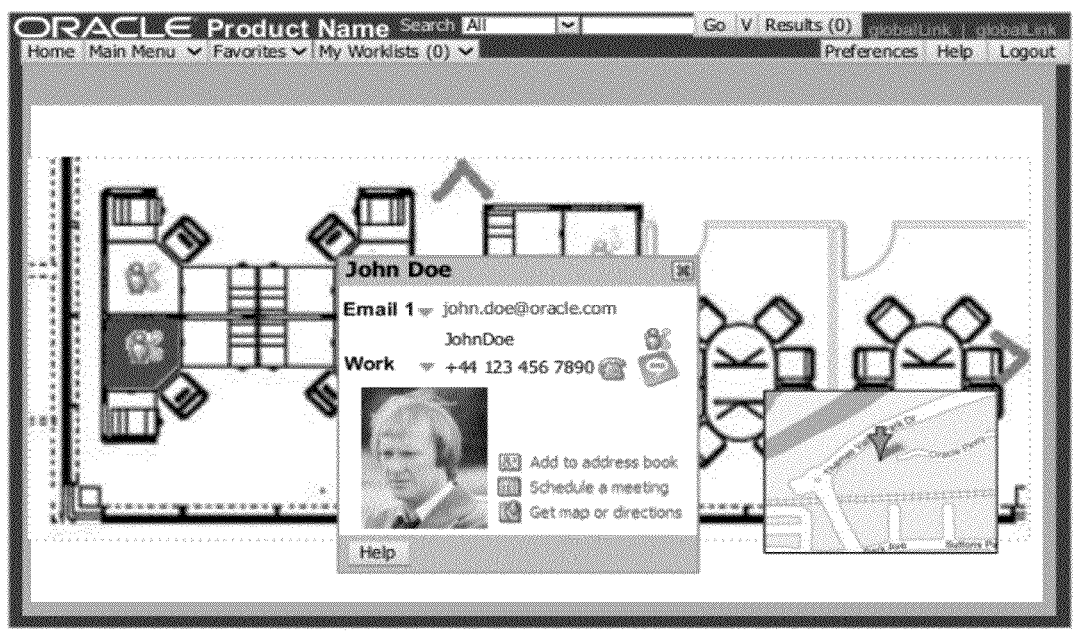
FIG. 10 is a screen shot showing a floor plan level view of a corporation map according to one embodiment.

FIG. 10 depicts an example of a screen shot provided to a user via a user interface associated with end user device 14 of the person requesting information about a person of interest. In FIG. 10, the screen shot includes a view of a corporation map shown at a floor plan level. The corporation map is associated with the mapping and floor plan information stored, for example, in presence mapping system 24. According to one implementation, expanded information is included in a window superimposed over the floor plan in FIG. 10.

The embodiments described herein represent a number of implementation examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A system associated with an organization, the system comprising:
   a data network in communication with a plurality of end user devices; and
   a presence mapping system in communication with the data network;
   wherein, in response to receiving a request from one of the end user devices to inquire about the presence of a specific person within the organization, the presence mapping system determines a first work area where the specific person is determined to likely be physically working within the organization;
   wherein the presence mapping system reproduces a specific section of a floor plan showing the first work area;
   wherein the presence mapping system provides the name of the specific person associated with the first work area and shows presence information of the specific person, wherein the presence information of the specific person comprises a first indication that the specific person is not present at the first work area if the specific person is not present;
   wherein the reproduced section of the floor plan includes a surrounding area that comprises additional work areas of at least one other person and a name field including the name and presence information of the at least one other person associated with one of the additional work areas, wherein the presence information of the at least one other person comprises an indication that the at least one other person is not present at the additional work areas if the at least one other person is not present, and wherein the name field including the name and presence information of the at least one other person is displayed on the surrounding area where the at least one other person is determined to likely be physically working within the organization.

2. The system of claim 1, wherein presence is related to activity of a person accessing the data network via a respective end user device.

3. The system of claim 1, wherein the first work area includes one or more access mechanisms for allowing one or more end user devices to access the data network.

4. The system of claim 1, wherein the presence mapping system is further configured to reproduce the specific section of the floor plan to show one or more additional work areas in the vicinity of the first work area; and
   wherein the presence mapping system is further configured to provide the name and presence status of each of the people associated with the one or more work areas in the specific section of the floor plan.

5. The system of claim 4, further comprising a telephone network in communication with a plurality of telephones, wherein each work area includes one or more data access mechanisms for allowing an end user device to access the data network and one or more telephone access mechanisms for allowing a telephone to access the telephone network.

6. The system of claim 5, wherein presence is related to activity of a person accessing the data network via a respective end user device.

7. The system of claim 5, wherein presence is related to activity of a person accessing the telephone network via a respective telephone.

8. The system of claim 4, further comprising a presence network in communication with a plurality of presence detecting devices, wherein the work areas include one or more access mechanisms for allowing an end user device to access the data network and one or more presence detecting devices for monitoring the physical presence of a person.

9. The system of claim 8, wherein presence is related to activity of a person accessing the data network via a respective end user device.

10. The system of claim 8, wherein presence is related to physical presence information sensed by a respective presence detecting device.

11. The system of claim 10, wherein physical presence information is sensed by monitoring motion.

12. The system of claim 4, wherein the end user device includes presence mapping software adapted to display the specific section of the floor plan and names of the people associated with work areas in the specific section of the floor plan, to monitor the location of a cursor control device with respect to the specific section of the floor plan, and to display additional information about a first person associated with a work area in the specific section of the floor plan when a cursor is positioned above the name of the first person for a predetermined length of time.

13. A presence system comprising:
   a processing device configured to control the operations of the presence system;
   a memory device configured to store presence mapping software executable by the processing device; and
   a data network interface that communicates with a data network associated with an organization;
   wherein the processing device determines a first work area where the person of interest is determined to likely be physically working within the organization;
   wherein the processing device generates a first section of a floor plan including at least the first work area;
   wherein the processing device retrieves first presence information about the person of interest, wherein the first presence information about the person of interest comprises a first indication that the person of interest is not present at the first work area if the specific person is not present;
   wherein the generated first section of the floor plan includes a surrounding area that comprises additional work areas of at least one other person associated with the organization and a name field including the name and presence information of the at least one other person associated with one of the additional work areas, wherein the presence information of the at least one other person comprises an indication that the at least one other person is not present at the additional work areas if the at least one other person is not present, and wherein the name field including the name and presence information of the at least one other person is displayed on the surrounding area where the at least one other person is determined to likely be physically working within the organization.

14. The presence system of claim 13, wherein the processing device is further configured to determine one or more work areas in the first section of the floor plan and one or more other people associated with the one or more other work areas; and wherein the processing device is further configured to retrieve information about the one or more other people.

15. The presence system of claim 13, further comprising:
a telephone network interface configured to communicate with a telephone network associated with the organization; and
a presence network interface configured to communicate with a presence network associated with the organization.

16. The presence system of claim 13, wherein the processing device is further configured to operate in a set-up mode to enable one or more members of the organization to enter mapping information, floor plan information, personnel information, and information associating one or more people of the organization with one or more work areas that contain spaces with respect to the floor information.

17. A method for monitoring the presence of a person, the method comprising:
receiving from a requestor the name of a person of interest, both the requestor and person of interest being associated with an organization;
retrieving information regarding a first work area where the person of interest is determined to likely be physically working within the organization;
reproducing a section of a floor plan containing at least the first work area;
sending the section of the floor plan to the requestor; and
sending a name field to the requestor, the name field including the name and presence status of the specific person associated with the first work area, wherein the presence status of the specific person comprises a first indication that the specific person is not present at the first work area if the specific person is not present;
wherein the reproduced section of the floor plan includes a surrounding area that comprises additional work areas of at least one other person and a second name field including the name and presence status of the at least one other person associated with one of the additional work areas, wherein the presence status of the at least one other person comprises a second indication that the at least one other person is not present at the additional work areas if the at least one other person is not present, and wherein the second name field including the name and presence status of the at least one other person is displayed on the surrounding area where the at least one other person is determined to likely be physically working within the organization.

18. The method of claim 17, further comprising:
in addition to the first work area, identifying one or more other work areas within the section of the floor plan;
retrieving information regarding people associated with the one or more other work areas; and
sending a name field to the requestor for each of the people associated with the one or more other work areas in the section of the floor plan.

19. The method of claim 17, further comprising sending expanded fields to the requestor, each of the expanded fields including additional information about a person associated with a work area in the section of the floor plan.

20. The method of claim 19, wherein the additional information of each of the expanded fields includes at least one of a telephone number, extension number, cell phone number, e-mail address, emergency contact information, picture of person, and a name of person's manager.

\* \* \* \* \*